United States Patent
Li et al.

(10) Patent No.: US 6,192,175 B1
(45) Date of Patent: Feb. 20, 2001

(54) METHOD AND SYSTEM FOR PROVIDING A MULTI-CHANNEL OPTICAL FILTER

(75) Inventors: Wei Zhong Li, San Jose; Feng Liu, Sunnyvale; Wenhui Wang, San Jose, all of CA (US)

(73) Assignee: Oplink Communications, Inc., San Jose, CA (US)

( * ) Notice: Under 35 U.S.C. 154(b), the term of this patent shall be extended for 0 days.

(21) Appl. No.: 09/223,038

(22) Filed: Dec. 30, 1998

(51) Int. Cl.$^7$ ................................ G02B 6/26; G02B 6/42
(52) U.S. Cl. ..................... 385/27; 385/31; 385/33; 385/34; 385/36; 385/42; 385/39; 385/24; 359/129
(58) Field of Search .................. 385/27, 31, 33, 385/34, 36, 42, 39, 24; 359/129

(56) References Cited

U.S. PATENT DOCUMENTS

| | | | |
|---|---|---|---|
| 4,472,797 | * | 9/1984 | Nicia ......................................... 370/1 |
| 5,956,441 | * | 9/1999 | Fairchild ................................. 385/27 |
| 6,078,710 | * | 6/2000 | Li ............................................ 385/39 |

* cited by examiner

Primary Examiner—Cassandra Spyrou
Assistant Examiner—Leo Boutsikaris
(74) Attorney, Agent, or Firm—Sawyer Law Group LLP

(57) ABSTRACT

A system and method for filtering are disclosed. The system and method include providing first, second, third and fourth fibers for carrying a first, second, third, and fourth optical signals, respectively. The method and system also include providing a holder, a filter, and a first wedge assembly. The holder is for receiving the first fiber, the second fiber, the third fiber, and the fourth fiber therein. The filter is for filtering the first optical signal, the second optical signal, the third optical signal, and the fourth optical signal to provide a first filtered optical signal, a second filtered optical signal, a third filtered optical signal, and a fourth filtered optical signal. The first wedge assembly is disposed between the holder and the filter. The first wedge assembly is for directing the first optical signal towards the filter in a first path, for directing the second optical signal toward the filter in a second path, for directing the third optical signal towards the filter in a third path, and for directing the fourth optical signal toward the filter in a fourth path.

15 Claims, 3 Drawing Sheets

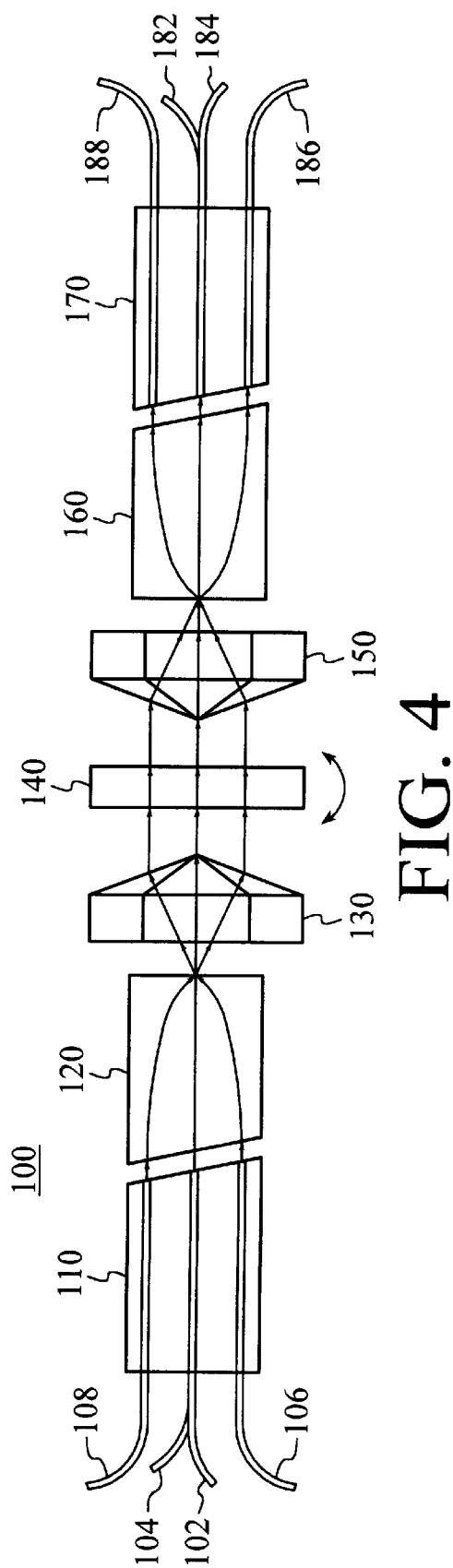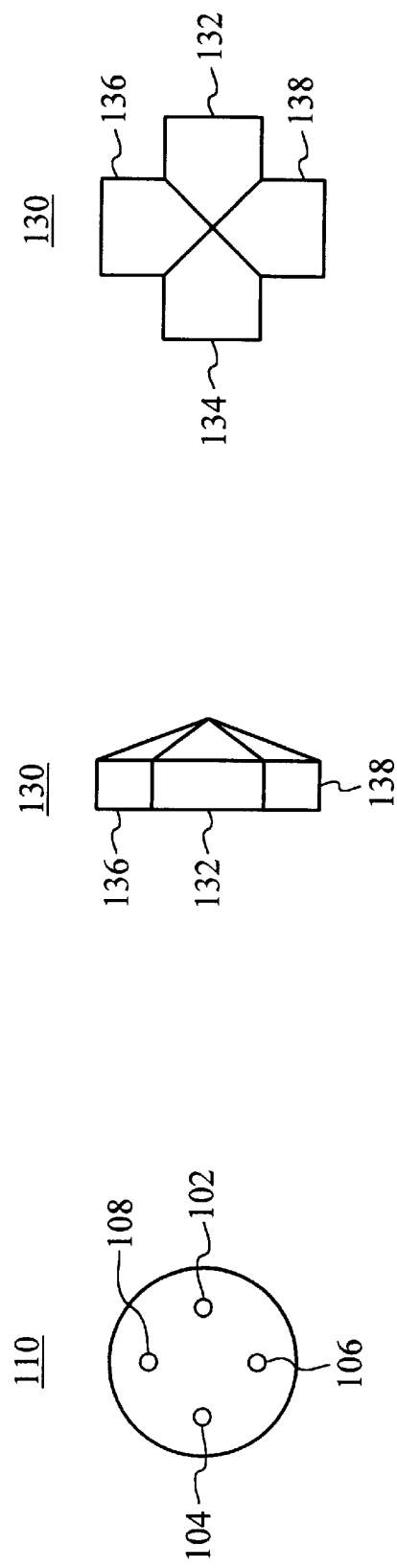

METHOD AND SYSTEM FOR PROVIDING A MULTI-CHANNEL OPTICAL FILTER

FIELD OF THE INVENTION

The present invention relates to optical technology, and more particularly to a method and system for filtering an optical signal.

BACKGROUND OF THE INVENTION

Optical technology utilizes optical signals in order to carry information. Optical technology also utilizes filters for a variety of applications. Filters transmit light in a pass band. The pass band of the filter is a range of wavelengths centered around a central wavelength. For example, one application for filters is in multiplexing and demultiplexing optical signals. It is possible to transmit a plurality of signals on a single fiber. As the use of optical technology increases, the number of signals transmitted on a single fiber also increases. Currently, composite signals include twenty, forty, or more channels.

In order to transmit a large number of signals on a given cable, channels for a plurality of wavelengths are multiplexed together for transmission. After the multiplexed, multi-channel signal reaches the destination, the channels are demultiplexed to access the information carried by a single channel. Conventional wavelength division multiplexers ("WDMs") are used to combine individual signals as well as to separate a composite signal into individual channels.

In order to function, some conventional WDMs utilize filtering. To separate a composite signal into its component channels, conventional filtering WDMs use a plurality filters cascaded in series to isolate each channel. Each filter passes light centered around a single wavelength. A filter is typically provided for each of the component wavelength. The output of each filter is the signal centered around a single wavelength. As each component wavelength is separated from the composite signal, the remaining portion of the composite signal is passed on to the next filter in the series. Thus, the signal is separated into its components. Note that other applications may also use filters. In general, filters are useful in applications where it is desired to remove a portion of the signal outside of the filter's pass band. Thus, in addition to WDMs, filters may be used in noise removal or other applications.

Typically, a signal is input to a conventional filtering system via an optical fiber. The fiber is typically held by a capillary. The signal is then provided to a graduated index of refraction (GRIN) lens for collimating. The signal is then transmitted to a filter. The filter transmits light centered around a particular wavelength. In a conventional WDM, a separate filtering system is used for each channel.

Although conventional systems for filtering signals are capable of transmitting light in the pass band, a conventional filter is used with a fixed angle of incidence. Thus, the central wavelength for the pass band is also fixed. As a result, the filter itself will be subject to tighter specifications in order to ensure that the appropriate portion of the signal is transmitted. The tighter specifications make the filter more expensive. In addition, one filter is typically used for each channel. As a result, the cost of providing filters for a composite signal is high. This is true because the cost of producing filters with different specifications is higher than the cost of producing filters having the same specifications. In addition, the filters will occupy a relatively large space.

Accordingly, what is needed is a system and method for providing a filter which is low cost, efficient, and compact. The present invention addresses such a need.

SUMMARY OF THE INVENTION

The present invention provides a method and system for filtering. The system and method comprise providing first, second, third and fourth fibers for carrying a first, second, third, and fourth optical signal, respectively. The method and system also comprise providing a holder, a filter, and a first wedge assembly. The holder is for receiving the first fiber, the second fiber, the third fiber, and the fourth fiber therein. The filter is for filtering the first optical signal, the second optical signal, the third optical signal, and the fourth optical signal to provide a first filtered optical signal, a second filtered optical signal, a third filtered optical signal, and a fourth filtered optical signal. The first wedge assembly is disposed between the holder and the filter. The first wedge assembly directs the first optical signal towards the filter in a first path, directs the second optical signal toward the filter in a second path, directs the third optical signal towards the filter in a third path, and directs the fourth optical signal toward the filter in a fourth path.

According to the system and method disclosed herein, the present invention is capable of filtering a plurality of optical signals using one filter, thereby decreasing overall system size and cost.

BRIEF DESCRIPTION OF THE DRAWINGS

FIG. 4 a block diagram of a filter in accordance with the present invention.

FIG. 5 a block diagram of one embodiment of a capillary in accordance with the present invention.

FIG. 6A is a block diagram of a side view of one embodiment of a wedge assembly in accordance with the present invention.

FIG. 6B is a block diagram of a front view of one embodiment of a wedge assembly in accordance with the present invention.

DETAILED DESCRIPTION OF THE INVENTION

The present invention relates to an improvement in optical filters. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
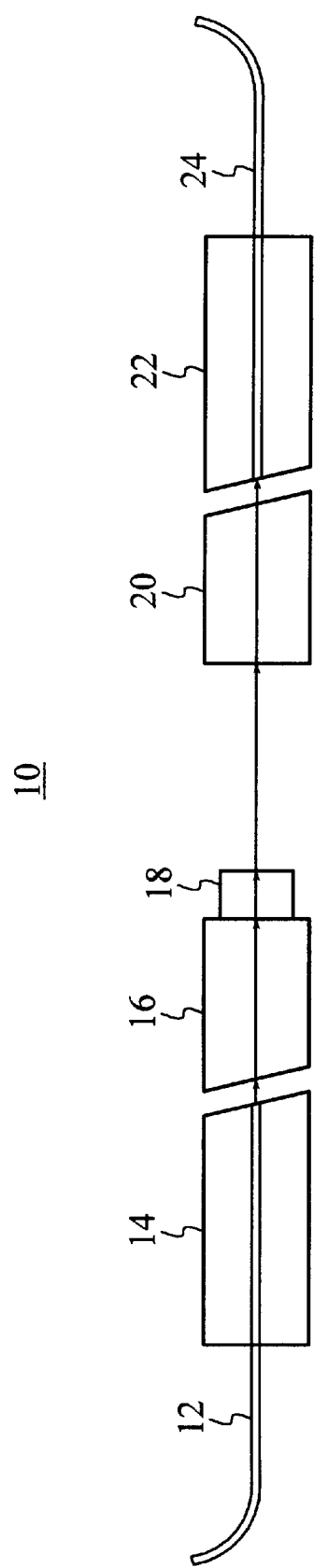
FIG. 1 is a block diagram of a conventional in line filter.

FIG. 1 is a block diagram of a conventional system 10 for filtering an optical signal. Such a conventional system 10 might be used for reducing cross-talk when demultiplexing composite optical signals including a plurality of channels. The conventional filtering system 10 is used to filter a signal carried on optical fiber 12. The signal is input from fiber 12 which is held in place by a capillary 14. The signal is transmitted to a graduated index of refraction ("GRIN") lens 16 which collimates the signal. After collimation, the optical signal is transmitted to a filter 18. The filter 18 transmits light in a pass band having a range of wavelengths a centered around a central wavelength. The transmitted light passes through a second GRIN lens 20 to a second fiber 24 held in place by a second capillary 22. Consequently, a filtered signal can be provided on the fiber 24. Thus, the conventional system can be used in applications which remove a portion of an optical signal, for example in a wavelength division multiplexer ("WDM"), not shown, which uses filters to isolate individual channels of a composite signal.

Although the conventional filtering system 10 is capable of filtering optical signals, one of ordinary skill in the art will recognize that the angle between the GRIN lens 16 and the filter 18 is typically fixed. The angle of incidence between the signal and a normal to the surface of the filter 18 is, therefore, also fixed. The central wavelength of the pass band depends on the angle of incidence. Because the angle of incidence is fixed, the central wavelength of the pass band for the filter 18 does not change. Consequently, the filter 18 must be manufactured to transmit only the appropriate range of wavelengths. These more stringent specifications increase the difficulty in and cost of producing a filter 18 and, therefore, any system which utilizes the filter 18.

In addition, the conventional system 10 is extremely expensive when used for filtering channels of conventional composite optical signals. Such conventional composite optical signals may have forty or more channels. Several systems 10 are typically used for each channel of the composite optical signal. To filter the channels of such a composite signal, the filter 52 in each system 10 transmits a channel. Each filter 52 has different specifications in order to transmit a different set of wavelengths and, therefore, transmit a particular channel. Consequently, not only are the specifications for each filter 52 stringent, but there are different specifications for each filter 52 in each system 10 used to transmit a different channel. Producing filters with different specifications is more expensive than producing filters having the same specification because the filters are produced in different lots. Thus, making each filter 52 with different specifications and with each set of specifications being closely controlled is extremely expensive. Moreover, a system which includes one system 10 for each channel is very large. Accordingly, what is needed is a method and system for reducing the size and cost of filtering optical signals.

Figure 2:
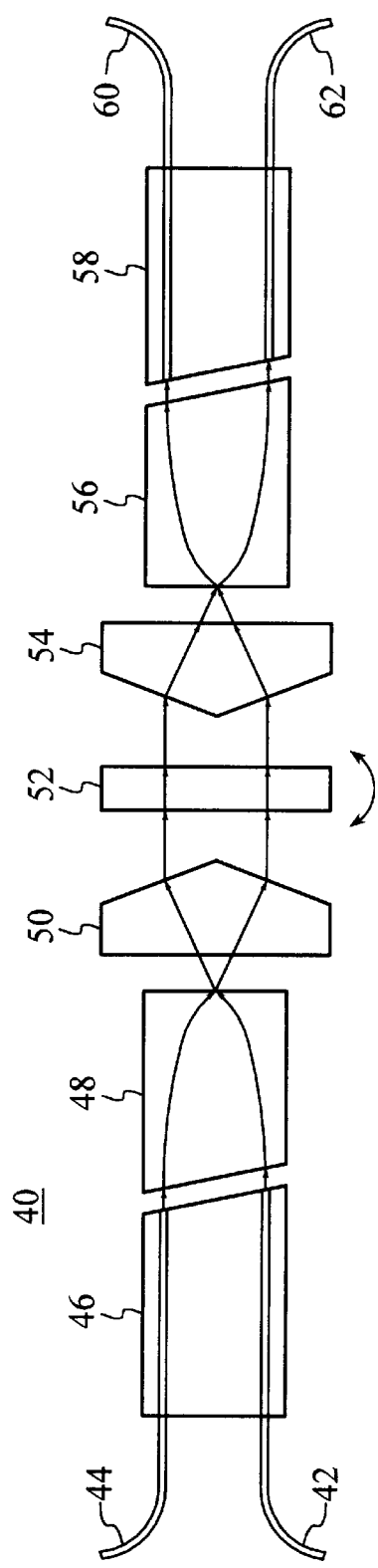
FIG. 2 is a block diagram of one embodiment of a filter using a wedge.
Figure 3:
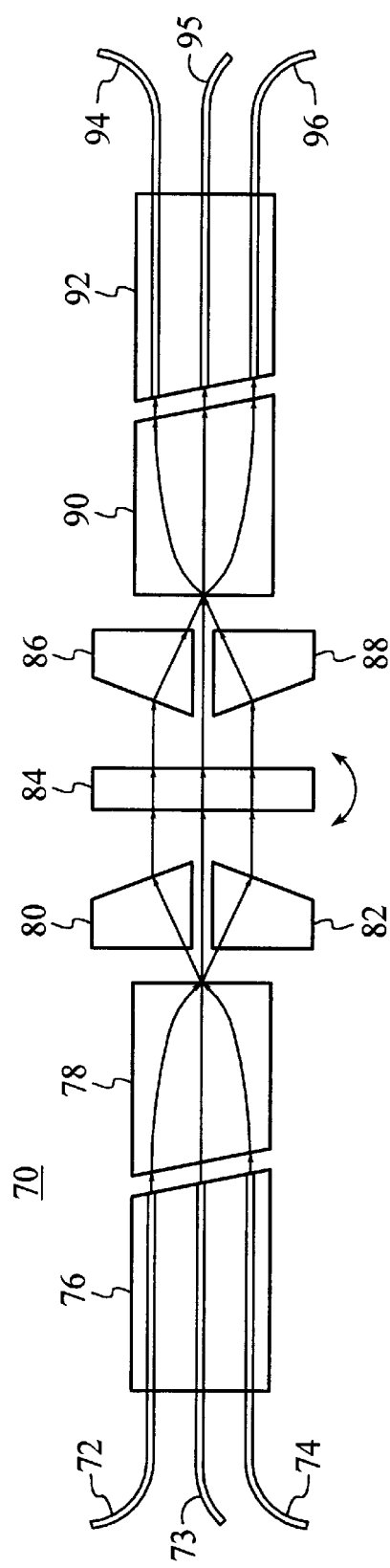
FIG. 3 is a block diagram another embodiment of a filter using a wedge.

Co-pending U.S. patent application Ser. No. 09/054,031 entitled "METHOD AND SYSTEM FOR PROVIDING A MULTI-CHANNEL OPTICAL FILTER" discloses utilizing a wedge in system for filtering an optical signal. FIGS. 2 and 3 depict alternate embodiments of systems 40 and 70, respectively, in accordance with the above-mentioned co-pending application.

Referring to FIG. 2, the system 40 includes a capillary 46 which holds first fiber 42 and second fiber 44. First and second optical signals may be input over the first and second fibers 42 and 44, respectively. The first and second optical signals are transmitted to a GRIN lens 48 which collimates the first and second optical signals. The first and second optical signals are transmitted by a first wedge 50. The first wedge 50 diffracts the first and second optical signals so that the first and second optical signals are provided to an optical filter 52 in paths that are substantially parallel. The filter 52 can be rotated to tune change the angle of incidence the first and second optical signals make with the filter 52. Thus, the filter 52 can be tuned to a particular wavelength. Thus, the system 40 can be tuned to transmit light of only certain wavelengths.

After the first and second optical signals have been filtered, they are transmitted to a second wedge 54. The second wedge 54 diffracts the first and second filtered optical signals so that the first and second filtered optical signals converge at or near an end of a second GRIN lens 56. The first and second filtered signals are transmitted from the GRIN lens 56 to a third optical fiber 60 and a fourth optical fiber 62, respectively. The third optical fiber 60 and fourth optical fiber 62 are held in a second capillary 58.

Referring now to FIG. 3, the system 70 functions similarly to the system 40. However, a first, a second, and a third optical signal are input over first fiber 72, second fiber 73 and third fiber 74, respectively. The first fiber 72, the second fiber 73 and the third fiber 74 are held by a first capillary 76. The first, second and third optical signals are collimated by a first GRIN lens 78. A first wedge 82 and a second wedge 80 diffract the first and third optical signals. As a result, the first, second, and third optical signals are substantially parallel when transmitted to a filter 84. The filter 84 can be rotated to tune the angle of incidence that the first, second, and third optical signals make with the filter 84.

After being filtered, the first and third filtered optical signals are diffracted by a third wedge 86 and a fourth wedge 88. The first, second, and third filtered optical signals are transmitted through a second GRIN lens 90 to a fourth fiber 94, a fifth fiber 95, and a sixth fiber 96, respectively. The fourth fiber 94, the fifth fiber 95, and the sixth fiber 96 are held by a second capillary 92.

Thus, the systems 40 and 70 are capable of filtering two and three optical signals, respectively. As a result, the size and cost of an optical system using the systems 40 and 70, respectively, are reduced.

Although the systems 40 and 70 function for their intended purpose, one of ordinary skill in the art will readily recognize that it would be desirable to further reduce the size and cost of systems for filtering optical signals. Accordingly, what is desired is a method and system for reducing the size and cost of filtering optical signals.

The present invention provides for a method and system for filtering optical signals. The present invention will be described in terms of a system for filtering four signals and using a particular configuration for a wedge assembly. However, one of ordinary skill in the art will readily recognize that this method and system will operate effectively for other numbers of signals and other configurations of wedge assemblies.

The present invention provides a method and system for filtering. The system and method comprise providing first, second, third and fourth fibers for carrying a first, second, third, and fourth optical signals, respectively. The method and system also comprise providing a holder, a filter, and a first wedge assembly. The holder is for receiving the first fiber, the second fiber, the third fiber, and the fourth fiber therein. The filter is for filtering the first optical signal, the second optical signal, the third optical signal, and the fourth optical signal to provide a first filtered optical signal, a second filtered optical signal, a third filtered optical signal, and a fourth filtered optical signal. The first wedge assembly is disposed between the holder and the filter. The first wedge assembly is for directing the first optical signal towards the filter in a first path, for directing the second optical signal toward the filter in a second path, for directing the third optical signal towards the filter in a third path, and for directing the fourth optical signal toward the filter in a fourth path.

To more particularly illustrate the method and system in accordance with the present invention, refer now to FIG. 4 depicting a block diagram of one embodiment of such a system. The system 100 includes first fiber 102, second fiber 104, third fiber 106, and fourth fiber 108. A first holder 110 holds the first fiber 102, the second fiber 104, the third fiber 106, and the fourth fiber 108. In a preferred embodiment, the first holder 110 is a capillary. The system 100 further includes a first lens 120, a second lens 160, and a second holder 170 which holds a fifth fiber 182, a sixth fiber 184, a seventh fiber 186, and an eighth fiber 188. In a preferred embodiment, the second holder 170 is a capillary. Also in a preferred embodiment, the first lens 120 and the second lens 160 are each a GRIN lens. Disposed between the first GRIN lens 120 and the second GRIN lens 160 are a first wedge assembly 130 and a second wedge assembly 150. The first wedge assembly 130 and the second wedge assembly 150 can change the direction of light transmitted by each wedge assembly 130 or 150. The system 100 further includes a filter 140 between the first wedge 130 and the second wedge 150. The filter 140 transmits light of a particular range of wavelengths. In a preferred embodiment, the filter 140 can be rotated.

The first fiber 102 carries a first optical signal. The second fiber 104 carries a second optical signal. The third fiber 106 carries a third optical signal, and a fourth fiber 108 carries a fourth optical signal. The first, second, third, and fourth optical signals are collimated by the GRIN lens 120 and transmitted to the first wedge assembly 130. The first wedge assembly 130 changes the direction of the first, second, third, and fourth optical signals, preferably through diffraction. The first, second, third, and fourth paths of the first, second, third, and fourth optical signals, respectively, are substantially parallel after transmission through the first wedge assembly 130.

The first, second, third, and fourth optical signals then pass through the filter 140 to provide first second, third, and fourth filtered optical signals, respectively. The filter 140 can be rotated. As a result, the angle of incidence between the normal to the surface of the filter 140 and the direction of propagation of the first, second, third, and fourth optical signals an be changed. Consequently, the wavelength of light which are transmitted by the filter 140 can be varied. As a result, the filter 140 can be tuned to transmit light of an appropriate range of wavelengths. Thus, the filter 140 can be tuned so that the appropriate portion of first, second, third, and fourth optical signals are transmitted by the filter 140.

The first, second, third, and fourth filtered optical signals are then transmitted to the second wedge assembly 150. The second wedge assembly 150 preferably changes the directions of the first, second, third, and fourth filtered optical signals. Preferably, the directions of first, second, third, and fourth filtered optical signals are changed such that the first, second, third, and fourth filtered optical signals converge at or near a face of the second GRIN lens 160. The first, second, third, and fourth filtered optical signals are then provided to the fifth fiber 182, the sixth fiber 184, the seventh fiber 186, and the eighth fiber 188, respectively.

Refer now to FIG. 5, which depicts one end of the holder 110. Preferably, the holder 170 is constructed in a similar fashion as the holder 110. In the embodiment of the first holder 110 depicted, the first fiber 102, the second fiber 104, the third fiber 106 and the fourth fiber 108 are arranged around a center of the holder 110.

FIGS. 6A and 6B depict a side view and a front view, respectively, of the first wedge assembly 130. The first wedge assembly 130 includes a first wedge 132, a second wedge 134, a third wedge 138, and a fourth wedge 136. Referring now to FIG. 5 and FIG. 6B, the first wedge 132 is preferably opposite to the first fiber 102. The second wedge 134 is preferably opposite to the second fiber 104. The third wedge 138 is preferably opposite to the third fiber 106. The fourth wedge 136 is preferably opposite to the fourth fiber 108. The first wedge 132 changes the direction of the first optical signal. The second wedge 134 changes the direction of the second optical signal. The third wedge 138 changes the direction of the third signal, and the fourth wedge 136 changes the direction of the fourth signal. After transmission through the first wedge assembly 140, therefore, the first, second, third, and fourth optical signals are preferably substantially parallel.

The second wedge assembly 150 is similar to the first wedge assembly 130. As a result, the second wedge assembly also preferably includes four wedges (not separately shown). The directions of the first, second, third, and fourth filtered signals are changed by the first, second, third and fourth wedges in the second wedge assembly 150. Thus, the first, second, third, and fourth filtered signals converge at or near the GRIN lens 160. The first, second, third, and fourth filtered signals are then provided to the second GRIN lens 160.

The system 100 can filter four optical signals because the first wedge assembly 130 and the second wedge assembly 150 can change the direction of the four optical signals to pass through the filter 140. Because the system 100 can filter four optical signals, fewer filters 140 are needed when using the conventional system 10 or the systems 40 and 70 in accordance with the above-mentioned co-pending application. As a result, a filtering system in accordance with the present invention is cheaper and occupies less space than the conventional system 10.

In addition, the cost of filtering multiple channel signals may be further reduced. Multiple systems 100 may be used where there are more than four optical signals to be filtered. In such a case, each system 100 is used to filter a set of four channels. Because the filter 140 can be tuned, filters 140 having the same specifications can be used in systems 100 filtering a different set of channels. A particular number of filters having the same specifications are less expensive to fabricate than the particular number of filters having different specifications. Consequently, the cost of filtering multiple channel signals may be further reduced.

For example, the system 100 may be used to filter channels in a composite signal including forty channels. For such a composite signal, ten systems 100 may be used to filter the forty channels. Each system 100 filters a set of four channels. Because the filter 140 can be tuned, some of the filters 140 for each of the ten systems 100 used to filter the forty channels may have the same specifications. The same filter 140 may be used for multiple sets of channels. In order to change the wavelengths transmitted by each filter 140 to a different set of wavelengths, the filter 140 is rotated to tune the angle of incidence for the four optical signals transmitted to each filter 140. Because the angle of incidence can be tuned to change the wavelengths transmitted, filters 140 having the same specifications can be used for multiple sets of channels.

Because filters 140 having the same specifications can be used for multiple sets of channels, the cost of filtering a multi-channel optical signal is further reduced. The filters 140 having the same specifications can be manufactured together. This reduces the cost of each filter 140 being used. Because the cost of the filters 140 having the same specifications is further reduced, the cost of filtering forty channels is further reduced. Moreover, the filter 140 need not be manufactured with as strict specifications as the conventional filter 10 because the filter 140 can be tuned.

A method and system has been disclosed for filtering an optical signal. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for filtering comprising:
   a first fiber, a second fiber, a third fiber, and a fourth fiber for carrying a first optical signal, a second optical signal, a third optical signal, and a fourth optical signal, respectively;
   a holder for receiving the first fiber, the second fiber, the third fiber, and the fourth fiber therein;
   a filter for filtering the first optical signal, the second optical signal, the third optical signal, and the fourth optical signal to provide a first filtered optical signal, a second filtered optical signal, a third filtered optical signal, and a fourth filtered optical signal; and
   a first wedge assembly disposed between the holder and the filter, the first wedge assembly for directing the first optical signal towards the filter in a first path, for directing the second optical signal toward the filter in a second path, for directing the third optical signal towards the filter in a third path, and for directing the fourth optical signal toward the filter in a fourth path, wherein the first path, the second path, the third path, and fourth path are substantially parallel.

2. The system of claim 1 wherein the first wedge assembly further comprises:
   a first wedge for directing the first optical signal towards the filter in the first path;
   a second wedge for directing the second optical signal toward the filter in the second path;
   a third wedge for directing the third optical signal towards the filter in the third path; and
   a fourth wedge for directing the fourth optical signal toward the filter in the fourth path.

3. The system of claim 2 wherein the filter is capable of being used to filter a plurality of channels.

4. The system of claim 3 further comprising:
   a first lens disposed between the first wedge and the holder, the filter making a first angle with the first wedge, the first lens for collimating the first optical signal, the second optical signal, the third optical signal, and the fourth optical signal, and the first angle being tunable.

5. The system of claim 1 wherein the first angle is approximately zero degrees.

6. The system of claim 4 further comprising:
   a fifth fiber, a sixth fiber, a seventh fiber, and an eighth fiber for receiving the first filtered optical signal, the second filtered optical signal, the third filtered optical signal, and the fourth filtered optical signal, respectively; and
   a second holder for receiving the fifth optical fiber, the sixth optical fiber, the seventh optical fiber, and the eighth optical fiber therein.

7. The system of claim 6 further comprising:
   a second wedge assembly disposed between the second holder and the filter, the second wedge assembly for directing the first filtered optical signal in a fifth path, directing the second filtered optical signal in a sixth path, for directing the third filtered optical signal in a seventh path, and for directing the fourth filtered optical signal in an eighth path;
   wherein the fifth path, the sixth path, the seventh path, and the eighth path are converging.

8. The system of claim 7 further comprising:
   a second lens disposed between the second wedge assembly and the second holder and making a second angle between the second lens and the holder, the second lens for collimating the first filtered optical signal, the second filtered optical signal, the third filtered optical signal, and the fourth filtered optical signal.

9. A method for providing filtering comprising the steps of:
   (a) providing a first optical signal, a second optical signal, a third optical signal, and a fourth optical signal over a first fiber, a second fiber, a third fiber, and a fourth fiber, respectively;
   (b) providing the first optical signal, the second optical signal, the third optical signal, and the fourth optical signal to a first wedge assembly for directing the first optical signal in a first path, for directing the second optical signal in a second path, for directing the third optical signal in a third path, and for directing the fourth optical signal in a fourth path, wherein the first path, the second path, the third path, and the fourth path are substantially parallel;
   (c) filtering the first optical signal to provide a first filtered optical signal, filtering the second optical signal to provide a second filtered optical signal, filtering the third optical signal to provide a third filtered optical signal, and filtering the fourth optical signal to provide a fourth filtered optical signal using a single filter; and
   (d) providing the first filtered optical signal, the second filtered optical signal, the third filtered optical signal and the fourth filtered optical signal to a fifth fiber, a sixth fiber, a seventh fiber, an eighth fiber, respectively.

10. The method of claim 9 wherein the first wedge assembly further comprises:
    a first wedge for directing the first optical signal towards the filter in the first path;
    a second wedge for directing the second optical signal toward the filter in the second path;
    a third wedge for directing the third optical signal towards the filter in the third path; and
    a fourth wedge for directing the fourth optical signal toward the filter in the fourth path.

11. The method of claim 10 wherein the filter is capable of being used for filtering a plurality of channels.

12. A method for of claim 11 further comprising the steps of:
    (e) providing a first optical signal, a second optical signal, a third optical signal, and a fourth optical signal over a first lens disposed between the first wedge assembly and the holder, the first lens making a first angle with the filter, the first lens for collimating the first optical signal, the second optical signal, the third optical signal, and the fourth optical signal.

13. The method of claim 12 wherein the first angle is greater than zero degrees.

14. A system for filtering comprising:
    a first fiber, a second fiber, a third fiber, and a fourth fiber for carrying a first optical signal, a second optical signal, a third optical signal, and a fourth optical signal, respectively;

a holder for receiving the first fiber, the second fiber, the third fiber, and the fourth fiber therein;

a filter for filtering the first optical signal, the second optical signal, the third optical signal, and the fourth optical signal to provide a first filtered optical signal, a second filtered optical signal, a third filtered optical signal, and a fourth filtered optical signal;

a first wedge assembly disposed between the holder and the filter, the first wedge assembly for directing the first optical signal towards the filter in a first path, for directing the second optical signal toward the filter in a second path, for directing the third optical signal towards the filter in a third path, and for directing the fourth optical signal toward the filter in a fourth path, wherein the first path, the second path, the third path, and fourth path are substantially parallel; and wherein the first wedge assembly further comprises:
- a first wedge for directing the first optical signal towards the filter in the first path;
- a second wedge for directing the second optical signal toward the filter in the second path;
- a third wedge for directing the third optical signal towards the filter in the third path; and
- a fourth wedge for directing the fourth optical signal toward the filter in the fourth path.

15. A method for providing filtering comprising the steps of:

(a) providing a first optical signal, a second optical signal, a third optical signal, and a fourth optical signal over a first fiber, a second fiber, a third fiber, and a fourth fiber, respectively;

(b) providing the first optical signal, the second optical signal, the third optical signal, and the fourth optical signal to a first wedge assembly for directing the first optical signal in a first path, for directing the second optical signal in a second path, for directing the third optical signal in a third path, and for directing the fourth optical signal in a fourth path, wherein the first path, the second path, the third path, and the fourth path are substantially parallel;

(c) filtering the first optical signal to provide a first filtered optical signal, filtering the second optical signal to provide a second filtered optical signal, filtering the third optical signal to provide a third filtered optical signal, and filtering the fourth optical signal to provide a fourth filtered optical signal using a single filter;

(d) providing the first filtered optical signal, the second filtered optical signal, the third filtered optical signal and the fourth filtered optical signal to a fifth fiber, a sixth fiber, a seventh fiber, an eighth fiber, respectively; and (e) wherein the first wedge assembly further comprises:
- a first wedge for directing the first optical signal towards the filter in the first path;
- a second wedge for directing the second optical signal toward the filter in the second path;
- a third wedge for directing the third optical signal towards the filter in the third path; and
- a fourth wedge for directing the fourth optical signal toward the filter in the fourth path.

* * * * *